US009158674B2

(12) United States Patent
Verhaeghe et al.

(10) Patent No.: US 9,158,674 B2
(45) Date of Patent: Oct. 13, 2015

(54) STORAGE DEVICE WITH HEALTH STATUS CHECK FEATURE (71) Applicants: Filip Verhaeghe, Milpitas, CA (US); Fadi Afa Al-Refaee, Milpitas, CA (US)

(72) Inventors: Filip Verhaeghe, Milpitas, CA (US); Fadi Afa Al-Refaee, Milpitas, CA (US)

(73) Assignee: SanDisk Technologies Inc., Plano, TX (US)

( * ) Notice: Subject to any disclaimer, the term of this patent is extended or adjusted under 35 U.S.C. 154(b) by 133 days.

(21) Appl. No.: 13/769,683

(22) Filed: Feb. 18, 2013

(65) Prior Publication Data

US 2014/0164674 A1  Jun. 12, 2014

Related U.S. Application Data (60) Provisional application No. 61/734,628, filed on Dec. 7, 2012.

(51) Int. Cl.
G06F 13/00 (2006.01)
G06F 12/02 (2006.01)
G06F 11/30 (2006.01)

(52) U.S. Cl.
CPC ........ *G06F 12/0246* (2013.01); *G06F 11/3034* (2013.01); *G06F 2212/7204* (2013.01); *G06F 2212/7205* (2013.01)

(58) Field of Classification Search
None
See application file for complete search history.

(56) References Cited

U.S. PATENT DOCUMENTS

| 2007/0260811 | A1* | 11/2007 | Merry et al. | 711/103 |
| 2009/0204853 | A1* | 8/2009 | Diggs et al. | 714/47 |
| 2009/0300598 | A1* | 12/2009 | Choi | 717/173 |
| 2010/0199023 | A1* | 8/2010 | Lee | 711/103 |
| 2012/0284587 | A1* | 11/2012 | Yu et al. | 711/103 |
| 2013/0159797 | A1* | 6/2013 | Peng et al. | 714/718 |

OTHER PUBLICATIONS

"Panasonic Professional SD Cards," http:business.panasonic.co.uk/professional-camera/recording-media/professional-sd-cards, 2 pages, copyright 2012, printed Jan. 2, 2013.
"S.M.A.R.T.," http://en.wikipedia.orq/wiki/S.M.A.R.T., 16 pages, printed Feb. 18, 2013.
"USB Flash Drive," http://en.wikipedia.org/wiki/USB_flash_drive, 21 pages, printed Feb. 18, 2013.

* cited by examiner

Primary Examiner — Aimee Li
Assistant Examiner — Jason Blust
(74) Attorney, Agent, or Firm — Brinks Gilson & Lione (57) ABSTRACT A storage device with a health status check feature is disclosed. In one embodiment, the storage device keeps track of the number of erase cycles performed on the memory of the storage device. The storage device also stores a value of the predicted limit on the number of times that erase cycles can be performed on the memory. In response to a request from a host device for the health status of the memory, the storage device can provide the host device with information about how many erase cycles have been performed on the memory as compared to the predicted limit.

18 Claims, 7 Drawing Sheets

| Byte # | Description | No. of Bytes | Type | Value |
|---|---|---|---|---|
| 1 | Customer ID | 2 | Hex | Extract from production parameter file<br>Default = 0x01 |
| 3 | Manufacture Date | 6 | ASCII | YYMMDD<br>Extract from production parameter file |
| 9 | Health Status in % used<br>% Used for User Area<br>% Used Spare Block | 1<br>1<br>1 | Hex<br>Hex<br>Hex | Calculated, See table 800 for values<br>Calculated<br>Calculated |
| 12 | Not used | | Hex | 0x00 |
| 400 | Controller Version | 20 | ASCII | Reserved |
| 420 | Firmware Version | 20 | ASCII | Reserved |
| 442-512 | Not used | | Hex | 00 |

0x00 is not used
0x0A = 0-10% used
0x14 = 10-20% usd
. . .

0x64 = 100% used
>0x65 = over 100% used

Figure 8

| Byte # | Description | No. of Bytes | Type | Value |
|---|---|---|---|---|
| 1 | ID | 2 | Hex | Extract from production parameter file Default = 0x01 |
|  | Not used | 6 | Hex | 00, use SD PID |
|  | Health Status in % used | 1 | Hex | Calculated |
|  | % Used for User Area | 1 | Hex | Calculated |
|  | % Used Spare Block | 1 | Hex | Calculated |
|  | Not used |  | Hex | 0x00 |
| 400 | Controller Version | 20 | ASCII | Reserved |
| 420 | Firmware Version | 20 | ASCII | Reserved |
| 441-512 | Not used |  | Hex |  |

STORAGE DEVICE WITH HEALTH STATUS CHECK FEATURE

CROSS-REFERENCE TO RELATED APPLICATION

This application claims the benefit of U.S. Provisional Patent Application No. 61/734,628, filed Dec. 7, 2012, which is hereby incorporated by reference herein.

BACKGROUND

Some magnetic, mechanically-rotating storage devices, such as some magnetic hard disk drives (HDD), can provide information to a host device to indicate how "healthy" the disk drive is (i.e., its ability to erase and hold data consistently). For example, some magnetic hard disk drives have a Self-Monitoring Analysis Reporting Technology (S.M.A.R.T.) feature in which, in response to receiving a number of commands from the host device, the magnetic hard disk drive reports back a number of metrics, such as the amount of storage written, the amount of free space, the temperature of the hard disk drive, and the number of bad blocks. The host device can combine these metrics into a formula to create a measure of how healthy the hard disk drive is.

In enterprise storage environments, some magnetic hard disk drive (HDD) and solid-state drive (SSD) solutions also uses the S.M.A.R.T feature, along with a number of proprietary mechanisms to determine the health of a storage device. Namely, the amount of storage historically written to the storage device, combined with the number of failing blocks as well as historical user bit error calculated from error correction code (ECC) formulae, can be used to determine how "healthy" the remaining flash is on the storage device.

While health status reporting has been used with magnetic hard disk drives and enterprise storage hard disk and solid state drives, there is no such reporting mechanism currently available for consumer solid-state storage devices, such as Secure Digital (SD) memory cards, microSD memory cards, Compact Flash (CF) memory cards, and universal serial bus (USB) devices. Some such devices are able to keep track of when blocks of memory are no longer able to accept a write command and internally mark that block as bad. When there are no good blocks of memory left, the memory device puts itself in a read-only mode and no longer accepts erase and write commands from a host device.

Overview

Embodiments of the present invention are defined by the claims, and nothing in this section should be taken as a limitation on those claims.

By way of introduction, the below embodiments relate to a storage device with a health status check feature. In one embodiment, the storage device keeps track of the number of erase cycles performed on the memory of the storage device. The storage device also stores a value of the predicted limit on the number of times that erase cycles can be performed on the memory. In response to a request from a host device for the health status of the memory, the storage device can provide the host device with information about how many erase cycles have been performed on the memory as compared to the predicted limit.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

As mentioned above, while health status reporting has been used with magnetic hard disk drives and enterprise storage hard disk and solid state drives, there is no such reporting mechanism currently available for consumer solid-state storage devices, such as Secure Digital (SD) memory cards, Compact Flash (CF) memory cards, and universal serial bus (USB) devices. The following embodiments can be used to provide such storage devices with a health status check feature. For example, the storage device can keep track of the number of erase cycles preformed on the memory of the storage device. The storage device can also store a value of the predicted limit on the number of times that erase cycles can be performed on the memory. In response to a request from a host device for the health status of the memory, the storage device can provide the host device with information about how many erase cycles have been performed on the memory as compared to the predicted limit. With this information, the host device can alert the user or take some other action.

Before turning to these and other embodiments, the following section provides a discussion of exemplary host and storage devices that can be used with these embodiments. Of course, these are just examples, and other suitable types of host and storage devices can be used.

Exemplary Host and Storage Devices

Figure 1:
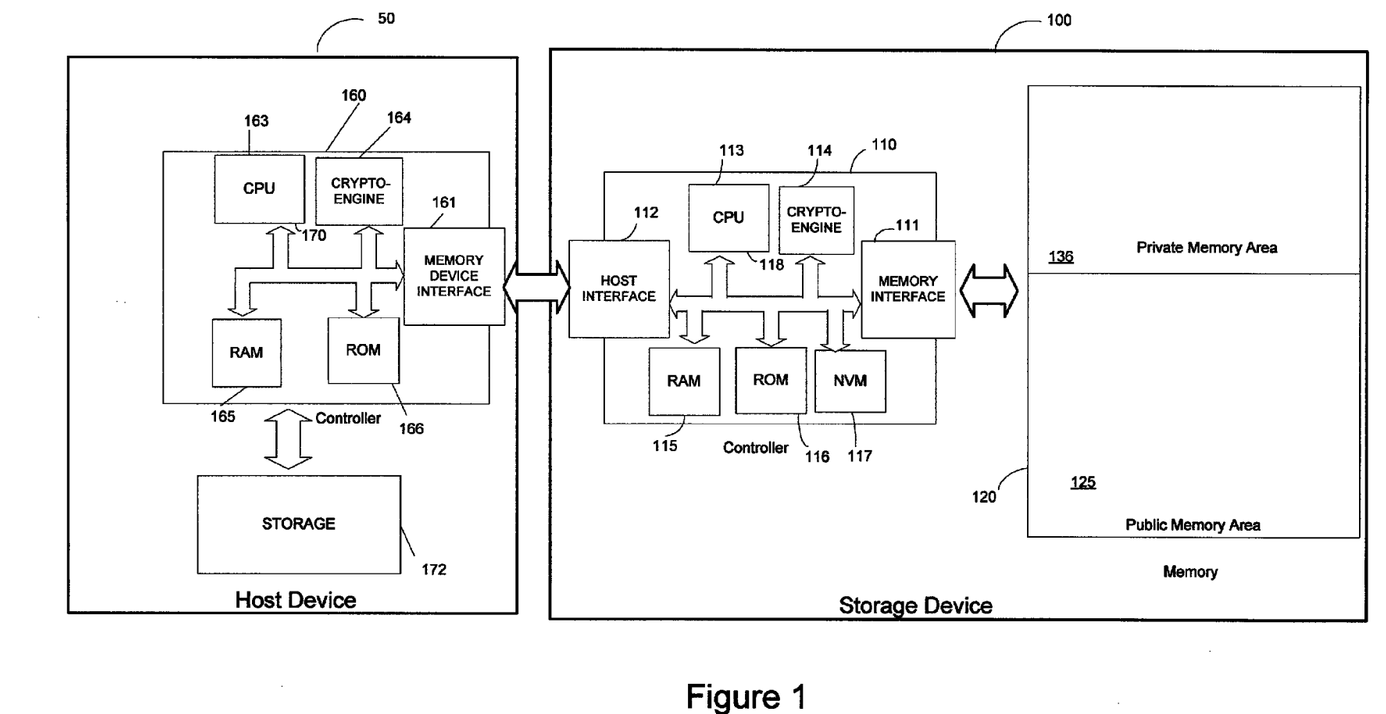
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. For example, the host device 50 and storage device 100 can each have mating physical connectors that allow the storage device 100 to be removably connected to the host device 50. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof. The storage device 100 can take any suitable form. In one embodiment, the storage device takes the form of a consumer, solid-state storage device, such as a Secure Digital (SD) memory card, a microSD memory card, a Compact Flash (CF) memory card, or a universal serial bus (USB) device. In this context, a "consumer device" is intended to distinguish from an enterprise storage device. An enterprise storage device is typically used for large-scale environments of business operations, such as large disk array solutions for on-line storage of data, large scale backup of a company's data, and long-term retention and archiving of business data for regulatory compliance. In contrast, a consumer, solid-state storage device is typically used to store user data and/or content for user consumption (e.g., audio and/or video files) and is often removable, portable, and of a relatively small form factor (e.g., sized to be easily held between two of the user's fingers). Also, while enterprise storage devices often use SATA or PATA interfaces, consumer, solid-state storage device can use an SD or USB interface, for example.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 113, an optional hardware crypto-engine 114 operative to provide encryption and/or decryption operations, read access memory (RAM) 115, read only memory (ROM) 116 which can store firmware for the basic operations of the storage device 100, and a non-volatile memory (NVM) 117 which can store a device-specific key used for encryption/decryption operations, when used. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from Marvell or SandForce. The controller 110 can be used to implement the methods shown in the flowcharts and described below.

The memory 120 can take any suitable form. In one embodiment, the memory 120 takes the form of a solid-state (e.g., flash) memory and can be one-time programmable, few-time programmable, or many-time programmable. The memory 120 can also use single-level cell (SLC), multiple-level cell (MLC), triple-level cell (TLC), or other memory technologies, now known or later developed.

The memory 120 can comprise a single partition or multiple partitions. In one particular embodiment, the memory 120 comprises a public memory area 125 that is managed by a file system on the host 50 and a private memory area 136 that is internally managed by the controller 110. The private memory area 136 can store data, such as but not limited to content encryption keys (CEKs) and firmware (FW) code. The public memory area 125 can store user data and other data. The public memory area 125 and the private memory area 136 can be different partitions of the same memory unit or can be different memory units. The private memory area 136 is "private" (or "hidden") because it is internally managed by the controller 110 (and not by the host's controller 160). Again, this is just one exemplary implementation, and other configurations of the memory 120 can be used.

Turning now to the host 50, the host 50 comprises a controller 160 that has a storage device interface 161 for interfacing with the storage device 100. The controller 160 also comprises a central processing unit (CPU) 163, an optional crypto-engine 164 operative to provide encryption and/or decryption operations, read access memory (RAM) 165, read only memory (ROM) 166, and storage 172. The storage device 100 and the host 50 communicate with each other via a storage device interface 161 and a host interface 112. As mentioned above, when the storage device 100 takes the form of a consumer, solid-state storage device, the interface between the host 50 and the storage device 100 can be an SD or USB interface, in contrast to a SATA or PATA interface. The host 50 can contain other components (e.g., a display device, a speaker, a headphone jack, a video output connection, etc.), which are not shown in FIG. 1 to simplify the drawings. Of course, in practice, the host device 50 and storage device 100 can have fewer or different components than the ones shown in the figure.

In some environments, the host device 50 is operable to render content stored in the storage device 100. As used herein, "content" can take any suitable form, including, but not limited to, a song, a movie, a game, an application ("app"), a game installer, etc. Depending on the type of content, "render" can mean playing (e.g., when the content is a song or movie), deciphering (e.g., when the content is a game installer), or whatever action is needed to "enjoy" the content. In some embodiments, the host device 50 contains the necessary software to render the content (e.g., a media player), whereas, in other embodiments, such software is provided to the host device 50 by the memory device 100 or another entity.

Embodiments Related to Health Check Feature

As mentioned above, while health status reporting has been used with magnetic hard disk drives and enterprise storage hard disk and solid state drives, there is no such reporting mechanism currently available for consumer solid-state storage devices, such as Secure Digital (SD) memory cards, Compact Flash (CF) memory cards, and universal serial bus (USB) devices. The following embodiments can be used to provide such storage devices with a health status check feature. In general, in this embodiment, the storage device 100 keeps track of the number of erase cycles preformed on the memory of the storage device. The storage device can also store a value of the predicted limit of the number of times that erase cycles can be performed on the memory. In response to a request from a host device for the health status of the memory, the storage device can provide the host device with information about how many erase cycles have been performed on the memory as compared to the predicted limit. For example, the storage device 100 can respond to a health status command from the host device 50 with a number from 0 to 100 that describes how much of the previously-consumed (i.e., erased) and initially-intended amount of total data to be written has been written as a percentage of that total. So, if the predicted number of erase cycles of the memory 120 of the storage device 100 is 10,000, and the average number of erase cycles across all of the available blocks of the memory 120 is 9,000, the storage device 100 can report to the host device 50 that 90% of the memory 120 is consumed.

Figure 2:
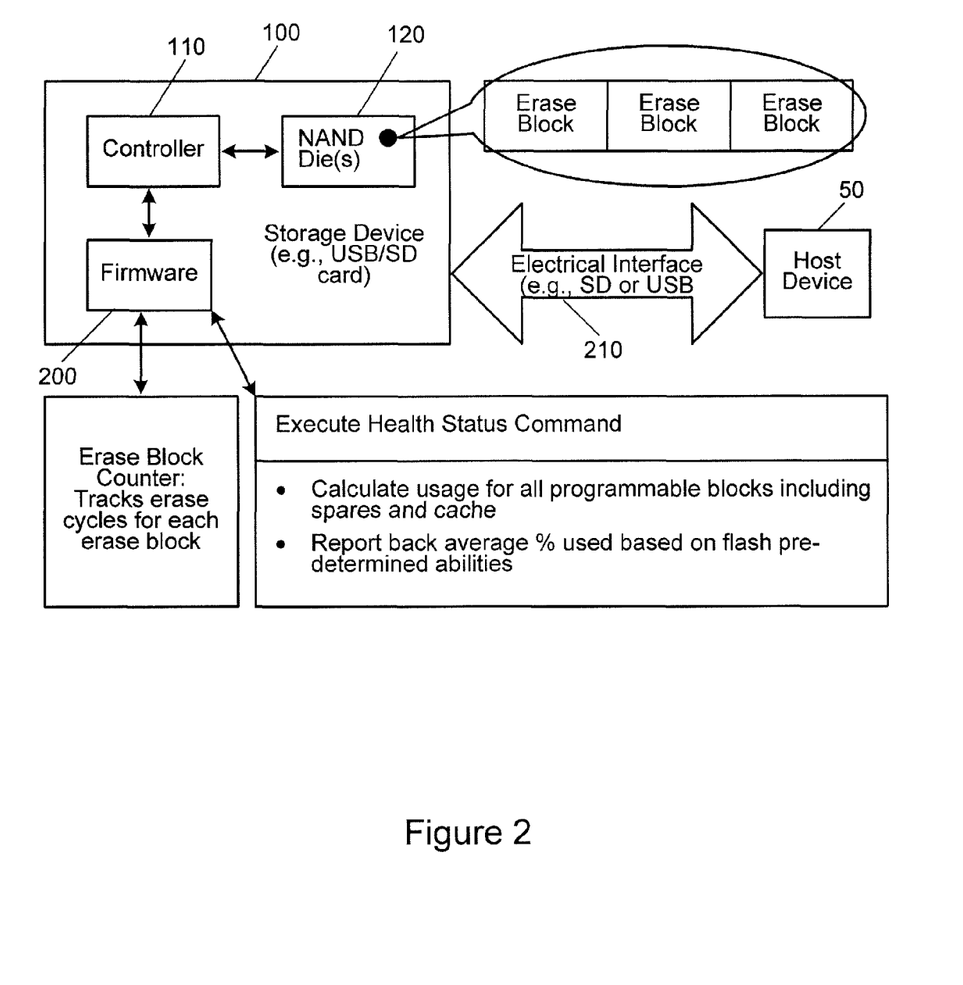
FIG. 2 is an annotated block diagram that illustrates an operation of a storage device of an embodiment.

FIG. 2 provides an annotated block diagram that illustrates the operation of this embodiment. It should be noted that, in this embodiment, the electrical interface 210 between the host device 50 and the storage device is a standard SD, CF, or USB interface and not a SATA or PATA interface used in enterprise storage solutions. This drawing shows that firmware 200 running on the controller 110 (the firmware 200 can be stored in the ROM 116 of the controller 110, for example) can implement an erase block counter, which tracks erase cycles for each memory block. In general, a block is a group of memory cells in the memory 120. In one embodiment, a block is 4 MB of memory. So, in a 16 GB memory card, there would be 4,000 blocks of user-addressable memory (there may be additional memory on the card that is for internal (i.e., non-user) use only). However, many memory cards overprovision the memory with spare blocks to be used when bad blocks are encountered. So, a 16 GB memory card may actually have a greater capacity (e.g., 16.1 GB) and, thus, more blocks. Erasing and writing to a block of memory cause wear on the memory cells, and, over time, a block can lose its ability to be able to erase and hold data consistently. A block of memory has a theoretical predicted limit on how many times it can be erased, and different memory devices can have different limits (these limits can be determined during manufacturing or in the field). The predicted limit is theoretical because, in practice, a block may be able to be erased more or less than the theoretical limit because of, for example, the operating conditions of the storage device 100.

Figure 3:
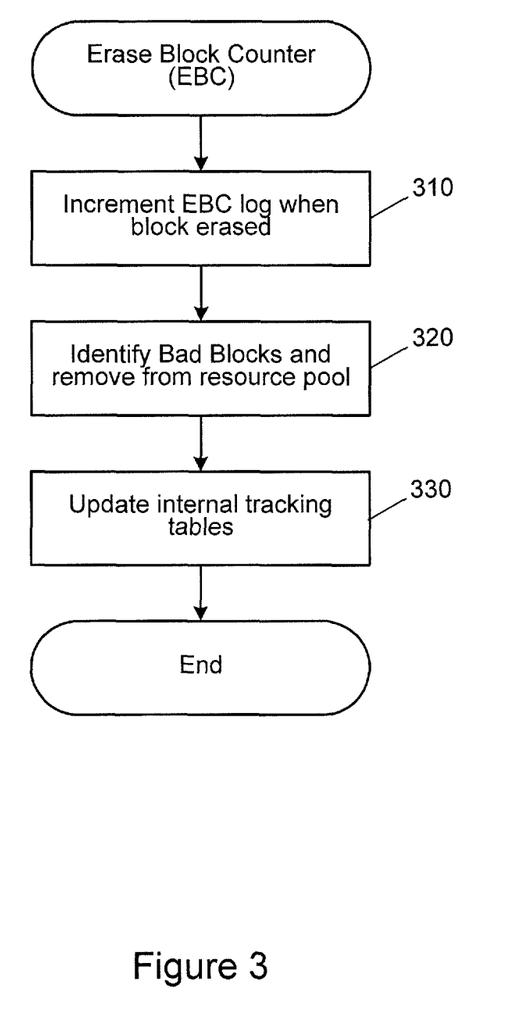
FIG. 3 is a flow chart showing an operation of an erase block counter of an embodiment.

As mentioned above, the controller 150 in this embodiment implements an erase block counter, and FIG. 3 is a flow chart showing an operation of an erase block counter of an embodiment. As shown in FIG. 3, when a block is erased, an erase block counter (EBC) log is incremented for that block (act 310). Additionally, when a bad block is identified (e.g., an erase or write can no longer be performed to that block), the erase block counter can remove it from the resource pool of available blocks (act 320). The erase block counter then updates its internal tracking tables (act 330). In this way, the erase block counter knows how many available blocks exist in the memory 120 of the storage device 100 and how many times erase cycles were performed on each of those blocks.

Figure 4:
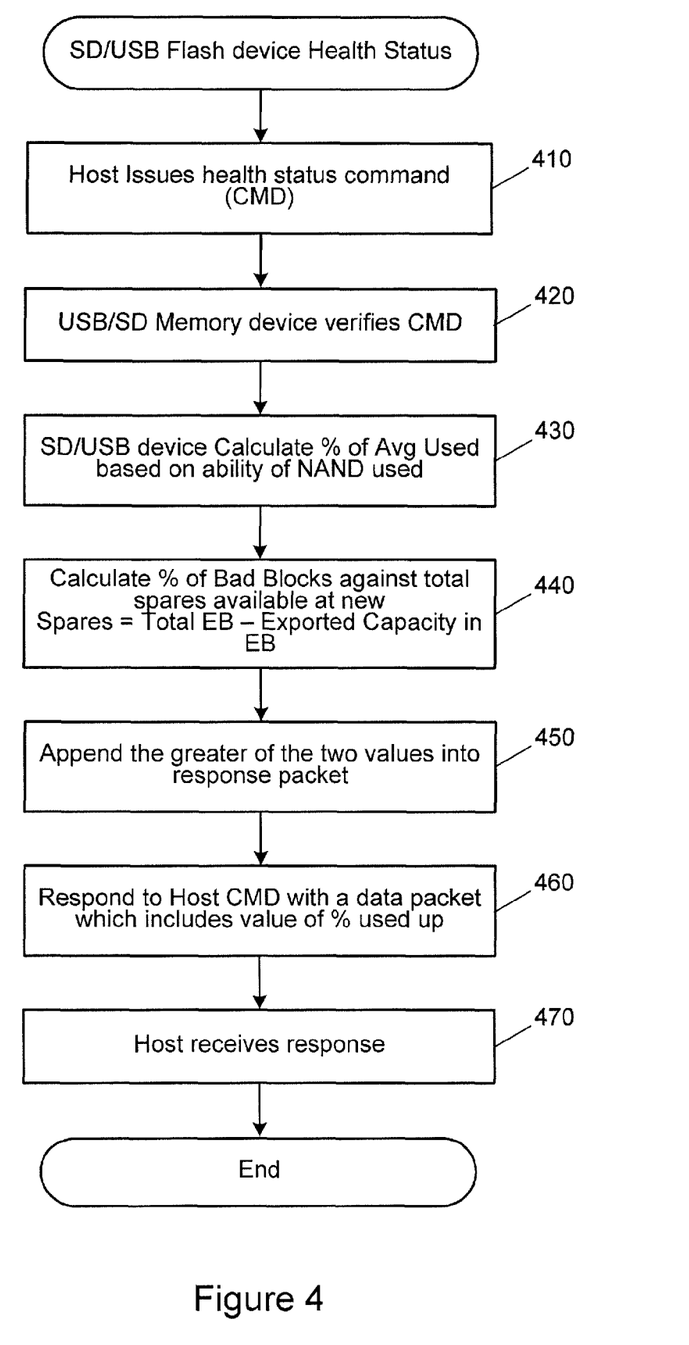
FIG. 4 is a flow chart showing an operation of a storage device of an embodiment in response to a health status command received from a host device.

Returning to FIG. 2, in response to a health status command from the host device 100, the controller 110 can calculate usage for all programmable blocks in the memory 120, including spare blocks and even blocks used for caching. The controller 110 then reports back the average percentage used based on the flash's predetermined abilities (i.e., the theoretical limit). (Of course, this is just one method that can be used, and others are possible.) FIG. 4 is a flow chart that illustrates this process in more detail. As shown in FIG. 4, when the host device 50 issues a health status command to the storage device 100 (act 410), the storage device 100 verifies the command (act 420). After the command has been verified, the storage device 100 calculates the percentage of average used blocks based on the ability of the particular memory (e.g., NAND) used (i.e., the theoretical limit) (act 430). The storage device 100 then calculates the percentage of bad blocks against the total number of spare blocks available when the memory device 100 was new (act 440). So, the number of spare blocks is equal to the total number of erase blocks minus the exported capacity in erased blocks. The storage device 100 then appends the greater of the two values into a response packet (act 450) and responds to the host device's command with the data packet, which includes the value of percentage of the blocks used (act 460). The host device 50 then receives the response (act 470) and can take appropriate action (e.g., alert the user of the health status level of the storage device 100).

There are several advantages associated with this embodiment. For example, it may be desired to use storage devices, such as memory cards, as high-endurance solutions in various applications to record short-term content that is then recycled (e.g., in time-shift buffers, digital video records and set-top boxes that allow a user to pause live TV, camera surveillance that relies upon edge detection to trigger a recording, in-car video recording storage systems, and short-term consumer video caching. Because of the repeated erase and write cycles inherent in these types of applications, it is desired to use high-endurance flash memory (e.g., memory capable of 10,000 or more program erase (P/E) cycles). Such a storage device may be intended to live on the shelf for a long time (1 to 10 years). So, it may be desired for a host device using this form of storage to be alerted in advance as to when the flash will no longer function reliably, so that it can prompt the user to perform a specific action (e.g., replace the storage device, alter recording behavior, etc.). In this embodiment, the health status check does not terminate the storage device's operability if it is still capable of operating. It is merely an indicator to the host device. Also, it should be noted that this alert can occur before the storage device actually fails, which is different from prior art storage devices that provide no advanced alert to the user prior to failure.

With a general embodiment now described, the following are details of one particular implementation. It should be noted that this is just one example of the many forms these embodiments can take, and the details of this particular embodiment should not be read into the claims unless explicitly recited therein.

In this embodiment, the storage device 100 has the ability to provide health status information, where "health" here is the percentage of lifespan used in percentage increments. The calculation can be reported to the host device 50 using OEM-specific commands. The calculation can take into consideration status of blocks in use and spare block availability.

Figure 5:
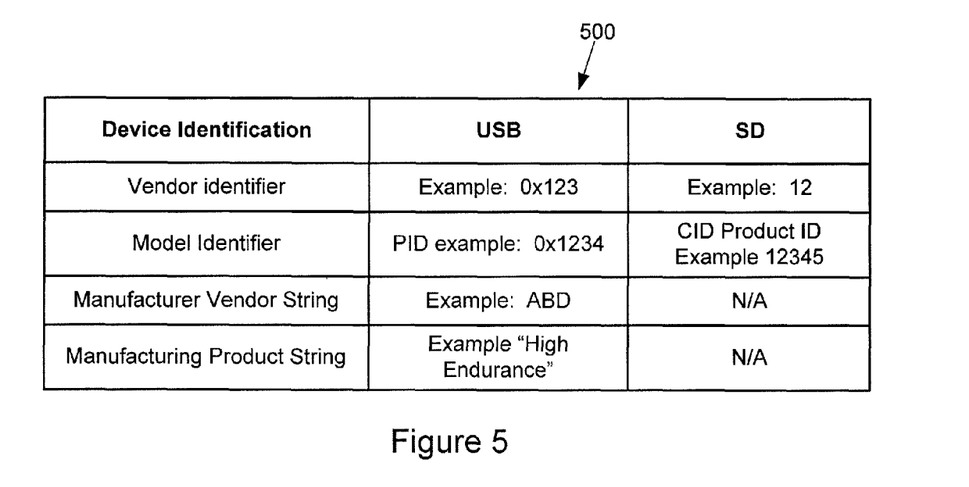
FIG. 5 is a table of information that can be queried from a storage device of an embodiment.

In this particular embodiment, the storage device 100 has the ability to store and query information about the manufacture of the device, including tools to query and set identified parameters, such as, but not limited to, firmware revision, firmware date, NAND memory information, controller information, date of manufacture, lot code, product name, product serial number, application ID, parameter file ID, page size, meta block size, and spare pool size. In one embodiment, the information shown in the table 500 of FIG. 5 is queryable using USB and SD commands, and the storage device 100 may be given the ability to change information.

As noted above, in this embodiment, the storage device 100 reports back to the host device the estimated percent used of the memory 120. A value of 100 or greater indicates the memory 120 has reached or exceeded its maximum theoretical write ability. In addition, in this embodiment, the storage device 100 also replies to the health status command from the host device 50 with custom OEM specific identifiers.

In this embodiment, the Health Status Used %=higher of User Health % or Spare Block % values, where the User Health %=(Avg erase cycles (or "hot count" (HC)) of the available erase blocks(AEB)/PEmax), where PEmax (the max Program Erase count) is a pre-defined value that can change over time and can be part of the internal production parameter file. The Spare Block %=(Bad Blocks/Total Spares). The available AEB are the AEBs made available as user space, and the Total Spares are the number of AEBs reserved as spares including any allocated as part of overprovisioning.

Figure 6:
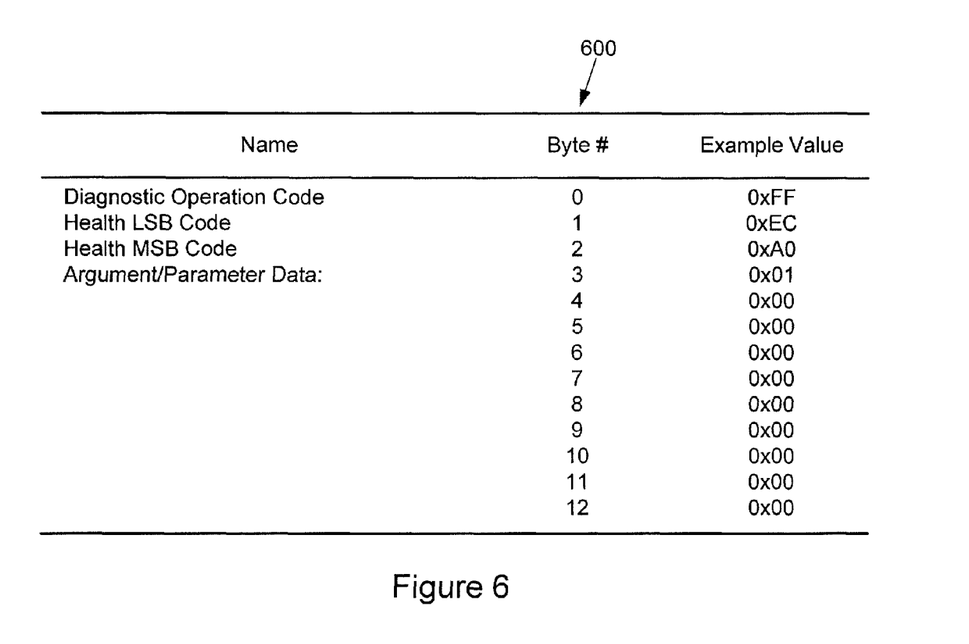
FIG. 6 is a table of information sent in a health status query command from a host device of an embodiment.
Figure 7:
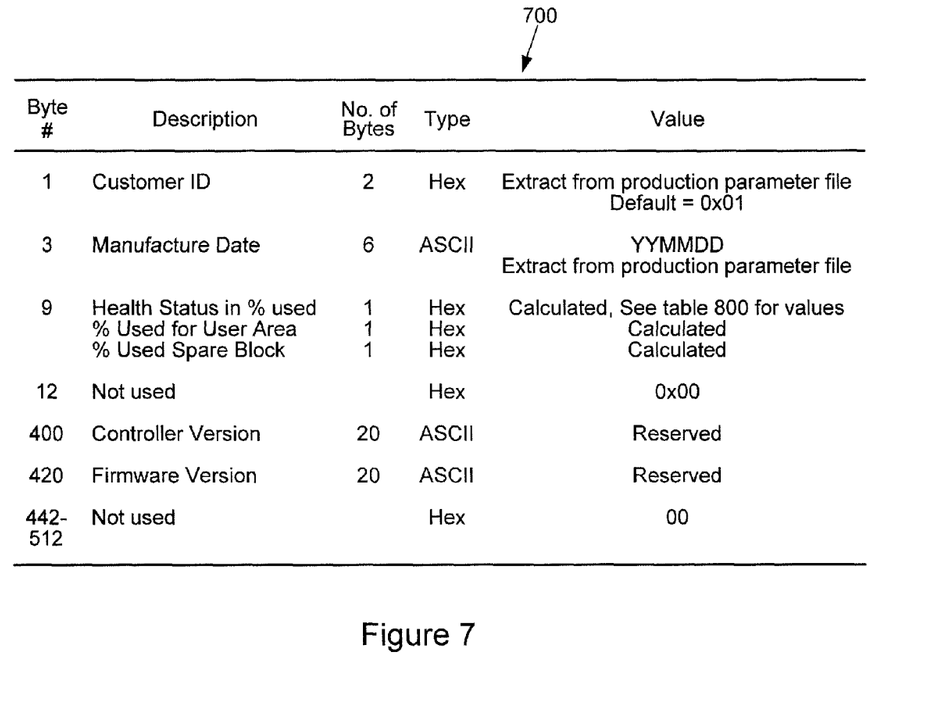
FIG. 7 is a table of information sent from a storage device of an embodiment in response to a health status query command received from a host device.
Figure 8:
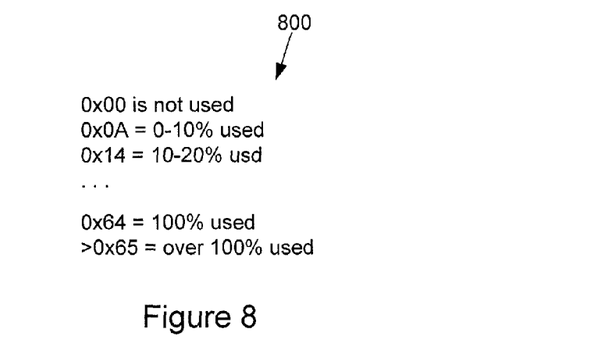
FIG. 8 is a table of information sent in one of the bytes of information shown in the table of FIG. 7.

In one embodiment, to send a USB health status query command, the host device 50 sends a SCSI diagnostic command consisting of 12 bytes, where the byte values are shown in table 600 in FIG. 6. The storage device 100 responds with 512 bytes, with the first byte, which is the least significant byte, containing information as defined in table 700 of FIG. 7. (The "calculated" values mentioned in table 700 of FIG. 7 are shown in table 800 of FIG. 8, which the number represents % used increments of 10%.) The byte fields contain real time calculated fields and static fields from a saved initial parameter file programmed into the storage device 100 at the time of manufacture.

Figure 9:
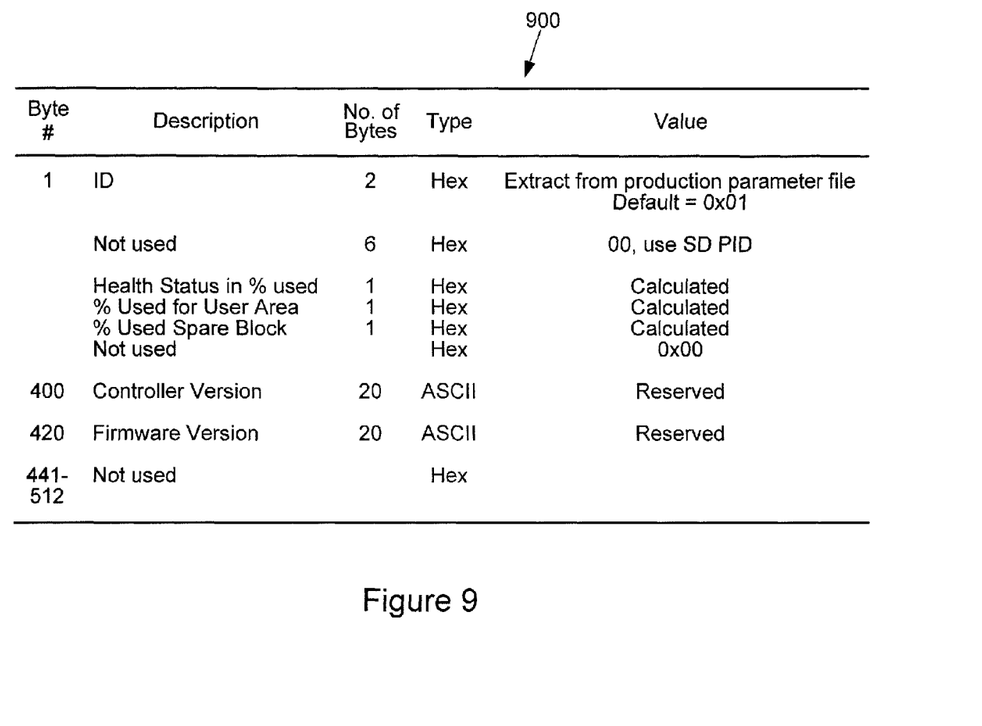
FIG. 9 is a table of information sent from a storage device of an embodiment in response to a health status query command received from a host device.

When an SD card is used instead of a USB device, the SD command to query health status can be a general command such as CMD56 read using a custom argument. This query expects a 512 byte response, with the first byte returned being byte 0. The four-byte argument used with CMD56 can be [00 00 05 FF]. Table 900 of FIG. 9 shows information that can be used in a response to such a command.

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage device comprising:
a memory; and
a controller in communication with the memory, wherein the controller is configured to perform the following:
track a number of erase cycles performed on the memory;
calculate a first percentage of how many erase cycles have been performed on the memory as compared to a defined parameter indicating a number of times that erase cycles can be performed on the memory;
calculate a second percentage of a number of bad blocks compared to a total number of spare blocks;
select a greater of the first and second percentages to provide to a host device in communication with the storage device; and
provide the greater of the first and second percentages to the host device in communication with the storage device.

2. The storage device of claim 1, wherein the memory is organized into a plurality of blocks, and wherein the controller is further configured to:
track a number of erase cycles performed on each block of memory; and
calculate an average of the number of erase cycles on the plurality of blocks, wherein the information provided to the host is the average of the number of erase cycles on the plurality of blocks as compared to the defined parameter.

3. The storage device of claim 1, wherein the storage device provides the host device with the information in response to a command received from the host device.

4. The storage device of claim 1, wherein the storage device is one of a Secure Digital (SD) memory card, a microSD memory card, and a universal serial bus (USB) memory device.

5. The storage device of claim 1, wherein the storage device is part of a time-shift buffer.

6. The storage device of claim 1, wherein the storage device comprises an enterprise storage device.

7. The storage device of claim 6, wherein the enterprise storage device uses a serial interface.

8. The storage device of claim 6, wherein the enterprise storage device uses a parallel interface.

9. A method for providing health status information of a storage device, the method comprising:
performing the following in a storage device having a memory:
tracking a number of erase cycles performed on the memory;
calculating a first percentage of how many erase cycles have been performed on the memory as compared to a defined parameter indicating a number of times that erase cycles can be performed on the memory;
calculating a second percentage of a number of bad blocks compared to a total number of spare blocks;
selecting a greater of the first and second percentages to provide to a host device in communication with the storage device; and
providing the greater of the first and second percentages to the host device in communication with the storage device.

10. The method of claim 9, wherein the memory is organized into a plurality of blocks, and wherein the method further comprises:
tracking a number of erase cycles performed on each block of memory; and
calculating an average of the number of erase cycles on the plurality of blocks, wherein the information provided to the host is the average of the number of erase cycles on the plurality of blocks as compared to the defined parameter.

11. The method of claim 9, wherein the storage device provides the host device with the information in response to a command received from the host device.

12. The method of claim 9, wherein the storage device is one of a Secure Digital (SD) memory card, a microSD memory card, and a universal serial bus (USB) memory device.

13. The method of claim 9, wherein the storage device is part of a time-shift buffer.

14. The storage device of claim 1, wherein the total number of spare blocks is equal to a total number of erase blocks minus an exported capacity in erased blocks.

15. The method of claim 9, wherein the total number of spare blocks is equal to a total number of erase blocks minus an exported capacity in erased blocks.

16. The method of claim 9, wherein the storage device comprises an enterprise storage device.

17. The method of claim 16, wherein the enterprise storage device uses a serial interface.

18. The method of claim 16, wherein the enterprise storage device uses a parallel interface.

* * * * *